(12) United States Patent
Fukuoka et al.

(10) Patent No.: US 10,546,696 B2
(45) Date of Patent: Jan. 28, 2020

(54) ELECTROCHEMICAL ELEMENT

(71) Applicant: NITTO DENKO CORPORATION, Ibaraki-shi, Osaka (JP)

(72) Inventors: Takahiro Fukuoka, Ibaraki (JP); Shunsuke Masaki, Ibaraki (JP); Takuya Muraoka, Kochi (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 55 days.

(21) Appl. No.: 16/061,705

(22) PCT Filed: Dec. 13, 2016

(86) PCT No.: PCT/JP2016/087050
§ 371 (c)(1),
(2) Date: Jun. 13, 2018

(87) PCT Pub. No.: WO2017/104658
PCT Pub. Date: Jun. 22, 2017

(65) Prior Publication Data
US 2018/0366275 A1 Dec. 20, 2018

(30) Foreign Application Priority Data
Dec. 14, 2015 (JP) .................................. 2015-243653

(51) Int. Cl.
*H01G 9/02* (2006.01)
*H01G 9/12* (2006.01)
(Continued)

(52) U.S. Cl.
CPC ................. *H01G 9/02* (2013.01); *H01G 9/12* (2013.01); *H01M 2/1264* (2013.01);
(Continued)

(58) Field of Classification Search
CPC ............. H01M 2/1264; H01M 2/1646; H01M 2/1673; H01M 10/0525; H01M 10/0585;
(Continued)

(56) References Cited

U.S. PATENT DOCUMENTS

| | | |
|---|---|---|
| 2011/0038101 A1 | 2/2011 | Caumont et al. |
| 2015/0325380 A1 | 11/2015 | Fukuoka et al. |
| 2016/0181583 A1 | 6/2016 | Fukuoka et al. |

FOREIGN PATENT DOCUMENTS

| | | |
|---|---|---|
| JP | 11-008169 A | 1/1999 |
| JP | 2003-297325 A | 10/2003 |

(Continued)

OTHER PUBLICATIONS

English translatiojn of PCT/IB/338 with attached Preliminary Report on Patentability (PCT/IB/373)and Written Opinion (PCT/ISA/237), received in counterpart PCT/JP2016/087050.
(Continued)

*Primary Examiner* — Brittany L Raymond
(74) *Attorney, Agent, or Firm* — Sughrue Mion, PLLC

(57) ABSTRACT

The purpose of the present invention is to provide an electrochemical element that can withstand prolonged use, with little damage or degradation due to the pressure of hydrogen gas generated, even when used for prolonged periods of time. This electrochemical element is equipped with a hydrogen-releasing film and has a laminated body in which an anode and a cathode are laminated with a separator interposed therebetween. The hydrogen-releasing film contains a metal layer, the separator contains pulp, and the total sulfur component content in the separator is 400 ppm or less as determined by quartz tube combustion gas absorption ion chromatography.

6 Claims, 2 Drawing Sheets

(51) Int. Cl.
  *H01M 2/12* (2006.01)
  *H01M 2/16* (2006.01)
  *H01M 10/0525* (2010.01)
  *H01M 10/0585* (2010.01)
  *H01G 9/04* (2006.01)

(52) U.S. Cl.
  CPC ....... *H01M 2/1646* (2013.01); *H01M 2/1673* (2013.01); *H01M 10/0585* (2013.01); *H01G 2009/0408* (2013.01); *H01M 10/0525* (2013.01)

(58) Field of Classification Search
  CPC ........... H01M 10/52; H01G 9/02; H01G 9/12; H01G 9/145; H01G 9/151; H01G 2009/0408; H01G 11/18; H01G 11/80
  See application file for complete search history.

(56) References Cited

FOREIGN PATENT DOCUMENTS

| | | |
|---|---|---|
| JP | 2004-228019 A | 8/2004 |
| JP | 4280014 B2 | 6/2009 |
| JP | 2011-512664 A | 4/2011 |
| JP | 2014-212034 A | 11/2014 |
| WO | 2014/098038 A1 | 6/2014 |
| WO | 2015/019906 A1 | 2/2015 |

OTHER PUBLICATIONS

JPO Office Action for counterpart Application No. 2016-238675 dated Feb. 21, 2017.
International Search Report for PCT/JP2016/087050 dated Mar. 7, 2017 [PCT/ISA/210].
Written Opinion for PCT/JP2016/087050 dated Mar. 7, 2017 [PCT/ISA/237].

ELECTROCHEMICAL ELEMENT

CROSS REFERENCE TO RELATED APPLICATIONS

This application is a National Stage of International Application No. PCT/JP2016/087050, filed on Dec. 13, 2016, which claims priority from Japanese Patent Application No. 2015-243653, filed on Dec. 14, 2015 and Japanese Patent Application No. 2016-238675, filed on Dec. 8, 2016.

TECHNICAL FIELD

The present invention relates to an electrochemical element such as a battery, a condenser, a capacitor, or the like.

BACKGROUND ART

In recent years, aluminum electrolytic capacitors have been used in an application for inverters such as the wind power generation and solar power generation, and large-scale power sources such as batteries. In the aluminum electrolytic capacitors, hydrogen gas may be generated therein by a reverse voltage, overvoltage, and overcurrent, and there is a risk of rupture of an outer case by an increase in the internal pressure due to the generation of a large amount of hydrogen gas.

Therefore, ordinary aluminum electrolytic capacitors are provided with a safety valve having a special film. In addition to a function of releasing hydrogen gas in the inside of the capacitor to the outside, the safety valve has another function of preventing the rupture of the capacitor itself by self-destruction enabling to decrease the internal pressure of the capacitor when it is abruptly increased. As the special film that is a component of such a safety valve, for example, the following has been proposed.

Patent Document 1 has proposed a pressure regulator film equipped with a foil strip composed of a Pd—Ag alloy wherein 20 wt % (19.8 mol %) of Ag is incorporated into palladium.

However, the foil strip of Patent Document 1 has a problem that it tends to become brittle in an environment of about 50 to 60° C. or less and cannot maintain the function as a pressure regulator film for a long period of time. Thus, such a foil strip has not been put into practical use.

On the other hand, lithium-ion batteries are widely used in cellular phones, notebook computers, automobiles, or the like. Also in recent years, an interest in security for the lithium-ion batteries has grown in addition to higher capacity and improved cycle characteristics. In particular, gas generation in the cells of the lithium-ion batteries is known, and expansion and rupture of the battery pack accompanied with an internal pressure rise are concerned.

Patent Document 2 discloses use of an amorphous alloy (for example, 36Zr-64Ni alloy) composed of zirconium (Zr) and nickel (Ni) as a hydrogen permselective alloy film that selectively permeates hydrogen gas generated in the battery.

However, since the amorphous alloy becomes brittle due to the formation of a hydride compound ($ZrH_2$) upon contact with hydrogen at a low temperature range (e.g. 50° C.), such an amorphous alloy had a problem that it could not maintain the function as a pressure regulator film for a long period of time.

In order to solve the above problem, Patent Document 3 has proposed a hydrogen-releasing film comprising a Pd—Ag alloy wherein the content of Ag in the Pd—Ag alloy is 20 mol % or more.

In Patent Document 4, a hydrogen-releasing film that includes a Pd—Cu alloy and has a Cu content of 30 mol % or more in the Pd—Cu alloy has been proposed to solve the above problem.

However, the hydrogen-releasing films of Patent Documents 3 and 4 are not easily embrittled at the use temperature of an electrochemical element and have a sufficient hydrogen-releasing performance at the beginning of use, but it has been a problem that the hydrogen-releasing performance gradually decreases depending on the use environment.

PRIOR ART DOCUMENT

Patent Documents

Patent Document 1: Japanese patent No. 4280014
Patent Document 2: JP-A-2003-297325
Patent Document 3: WO2014/098038
Patent Document 4: WO2015/019906

SUMMARY OF THE INVENTION

Problems to be Solved by the Invention

The present invention has been made in view of the above problems, and an object of the present invention is to provide an electrochemical element that can withstand prolonged use, with little damage or degradation due to the pressure of hydrogen gas generated, even when used for prolonged periods of time.

Means for Solving the Problems

The invention is related to an electrochemical element equipped with a hydrogen-releasing film and having a laminated body in which an anode and a cathode are laminated with a separator interposed therebetween, wherein the hydrogen-releasing film contains a metal layer, the separator contains pulp, and the total sulfur component content in the separator is 400 ppm or less as determined by quartz tube combustion gas absorption ion chromatography.

The present inventors have conducted intensive studies on the cause of gradual deterioration of hydrogen-releasing performance of hydrogen-releasing films including a metal layer and found that such gradual deterioration is not due to the embrittlement of the metal layer by hydrogen but due to the fact that sulfur components generated from the separator made of a pulp used as a constituent member of the electrochemical element deteriorate the metal layer by corroding (oxidizing or sulfurizing) the metal layer, and as a result, the hydrogen-releasing performance gradually decreases. That is, it is considered that in the process of producing kraft pulp that is a raw material of the separator, sodium sulfide is used in the delignification process of removing fibers from wood chips with use of a chemical solution, and it is considered that this sodium sulfide binds to hydrocarbons in cellulose, thereby to generate various sulfur-based components.

The present inventors conducted intensive studies on solutions based on the above findings and found that by using a separator having a total sulfur component content of 400 ppm or less as determined by quartz tube combustion gas absorption ion chromatography, the metal layer is hardly deteriorated by corrosion, and as a result, even when used for a long time, the hydrogen-releasing performance of the hydrogen-releasing film is less likely to deteriorate.

The metal layer is preferably an alloy layer containing a Pd alloy from the viewpoint of being excellent in hydrogen permeability, oxidation resistance, and resistance to brittleness upon occluding hydrogen.

From the viewpoint of being excellent in hydrogen permeability, oxidation resistance, and resistance to brittleness upon occluding hydrogen, the Pd alloy preferably contains 20 to 65 mol % of the group 11 element. In addition, the group 11 element is preferably at least one element selected from the group consisting of Au, Ag, and Cu.

The Pd alloy layer containing a Pd-group 11 element alloy has a function to dissociate a hydrogen molecule into a hydrogen atom on the film surface; dissolve the hydrogen atom in the film; diffuse the hydrogen atom-solution to the low pressure side from the high pressure side; convert the hydrogen atom into the hydrogen molecule again on the film surface of the low pressure side; and release the hydrogen gas. If the content of the group 11 element is less than 20 mol %, there is a tendency that the strength of the Pd alloy becomes insufficient and the above-mentioned function is hardly developed. If the content of the group 11 element exceeds 65 mol %, the hydrogen permeation rate tends to decrease.

The hydrogen-releasing film preferably has a support on one side or both sides of the metal layer. The support is provided in order to prevent the metal layer from falling into the electrochemical element when the metal layer is detached from a safety valve or a hydrogen-releasing valve. In addition, in the case where the metal layer has a function as a safety valve that self-destructs when the internal pressure of the electrochemical element becomes equal to or greater than a predetermined value, if the metal layer is a thin film, the metal layer has a risk of self-destruction before the internal pressure of the electrochemical element reaches a predetermined value because of the low mechanical strength of the metal layer. Thus, the function as a safety valve cannot be fulfilled in such a case. Therefore, when the metal layer is a thin film, it is preferable to laminate a support on one side or both sides of the metal layer in order to improve the mechanical strength.

The electrochemical element includes, for example, an aluminum electrolytic capacitor and a lithium-ion battery.

Effect of the Invention

Even when the electrochemical element of the present invention is used for prolonged periods of time, the hydrogen-releasing performance of the hydrogen-releasing film is unlikely to be lowered, and only the hydrogen gas generated inside the electrochemical element can be promptly discharged to the outside. As a result, breakage of the electrochemical element due to the pressure of the hydrogen gas generated inside of the electrochemical element can be effectively prevented. In addition, the hydrogen-releasing film can prevent impurities from entering the inside of the electrochemical element from the outside. In addition, when the internal pressure of the electrochemical element rapidly rises, the hydrogen-releasing film may have a function of self-destruction to lower the internal pressure and prevent rupture of the electrochemical element itself. By these effects, the initial performance of the electrochemical element can be maintained for prolonged periods of time, and the lifetime of the electrochemical element can be prolonged.

MODE FOR CARRYING OUT THE INVENTION

Figure 1A:
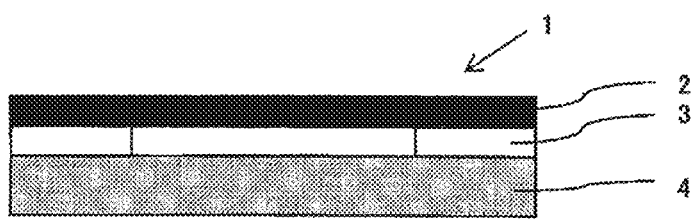
FIGS. 1(a) and 1(b) are schematic sectional views showing the structure of the hydrogen-releasing film of the present invention.

Hereinafter, embodiments of the present invention will be described.

The electrochemical element of the present invention has a hydrogen-releasing film for discharging hydrogen gas generated inside the electrochemical element to the outside and has a laminate in which an anode and a cathode are laminated with a separator interposed therebetween. Examples of the electrochemical element include a battery, a condenser, a capacitor, and the like, and it is particularly preferable that the electrochemical element is an aluminum electrolytic capacitor or a lithium ion battery. As for the constituent members other than the hydrogen-releasing film and the separator, conventional ones can be used without particular limitation. In addition, the electrochemical element of the present invention can be manufactured by a conventional method except that the following hydrogen-releasing film and separator are used. Hereinafter, the hydrogen-releasing film and the separator will be described in detail.

The hydrogen-releasing film includes a metal layer. It is necessary for the metal layer to discharge only hydrogen gas generated inside the electrochemical element to the outside and prevent substances from entering the inside of the electrochemical element from the outside. For example, the metal layer is a non-porous body having substantially no micro through holes.

The metal forming the metal layer is not particularly limited as long as it is a simple substance or a metal having a hydrogen permeating function by alloying, and examples thereof may include Pd, Nb, V, Ta, Ni, Fe, Al, Cu, Ru, Re, Rh, Au, Pt, Ag, Cr, Co, Sn, Zr, Y, Ce, Ti, Ir, Mo, and an alloy containing two or more of these metals.

The metal layer is preferably an alloy layer containing a Pd alloy. The other metal forming the Pd alloy is not particularly limited, but an element of group 11 is preferably used, and at least one element selected from the group consisting of Au, Ag, and Cu is more preferably used. In particular, the Pd—Au alloy is preferable because it has an excellent corrosion resistance to a gas component generated from an electrolytic solution or a constituent member inside the electrochemical element. The Pd alloy preferably contains 20 to 65 mol %, more preferably 30 to 65 mol %, and still more preferably 30 to 60 mol % of the group 11 element. The alloy layer containing a Pd—Ag alloy having an Ag content of 20 mol % or more, a Pd—Cu alloy having a Cu content of 30 mol % or more, or a Pd—Au alloy having an Au content of 20 mol % or more is preferable because such an alloy layer is difficult to embrittle with hydrogen even in a low temperature range of about 50 to 60° C. or less. In addition, the Pd alloy may contain a Group IB and/or Group IIIA metal as long as the effect of the present invention is not impaired.

The Pd alloy may be not only the alloy containing two components including Pd but also an alloy containing three components of, for example, Pd—Au—Ag or Pd—Au—Cu.

Further, the alloy layer containing a Pd alloy may be an alloy containing four components of Pd—Au—Ag—Cu. For example, in the case of a multi-component alloy containing Pd, Au and other metals, the total content of Au and other metals in the Pd—Au alloy is preferably 55 mol % or less, more preferably 50 mol % or less, still more preferably 45 mol % or less, particularly preferably 40 mol % or less.

The metal layer can be produced by, for example, a rolling method, a sputtering method, a vacuum deposition method, an ion plating method, and a plating method, but when producing a thick metal layer, it is preferable to use the rolling method and when producing a thin metal layer, it is preferable to use the sputtering method.

The rolling method may be a hot rolling method or a cold rolling method. The rolling method is a method comprising rotating a pair or pairs of rolls (rollers) and processing a raw material, metal into a film by passing it between the rolls under pressure.

The thickness of the metal layer obtained by the rolling method is preferably 5 to 50 μm, more preferably 10 to 30 μm. If the thickness of the layer is less than 5 μm, pinholes or cracks are likely to occur in the production of the layer, and deformation of such a layer easily occurs after absorbing hydrogen. On the other hand, when the thickness of the layer is more than 50 μm, such a layer is not desirable because its hydrogen-releasing performance is reduced due to a long time required for the hydrogen permeation and because the layer is inferior in terms of cost.

The sputtering method is not particularly limited, and can be carried out by using a sputtering apparatus such as a parallel flat plate type sputtering apparatus, a sheet type sputtering apparatus, a passing type sputtering apparatus, a DC sputtering apparatus, and an RF sputtering apparatus. For example, after having attached a substrate to a sputtering apparatus in which a metal target is placed, the sputtering apparatus is evacuated, adjusted to a predetermined pressure value with an Ar gas, and a predetermined sputtering current is charged to the metal target, thereby to form a metal film on the substrate. Then, the metal film is peeled off from the substrate to obtain a metal layer. It should be noted that it is possible to use, as the target, a single or multiple targets according to the metal layer to be produced.

As the substrate, it includes, for example, a glass plate, a ceramic plate, a silicon wafer, and a metal plate such as aluminum and stainless steel.

The thickness of the metal layer obtained by the sputtering method is preferably 0.01 to 5 μm, more preferably 0.05 to 2 μm. If the thickness of the layer is less than 0.01 μm, not only may pinholes be formed, but also it is difficult to obtain a required mechanical strength. Also, when the layer is peeled off from the substrate, it is likely to be damaged and its handling after the peeling becomes difficult. On the other hand, when the thickness of the layer is more than 5 μm, it takes time to produce the metal layer and such a layer is inferior in regards to cost, which is not desirable.

The film area of the metal layer can be appropriately adjusted in consideration of the hydrogen permeation amount and the film thickness, but when the hydrogen-releasing film is used as a component of a safety valve, the film area is about 0.01 to 100 mm$^2$. It should be noted that the film area in the present invention is an area of actually releasing hydrogen in the metal layer and does not include a portion coated with a ring-shaped adhesive which will be described later.

A coat layer other than a metal layer may be provided on the surface of the metal layer. By providing the coat layer, it is possible to prevent contaminants (for example, electrolytic solution) other than sulfur components generated from the separator from adhering to the surface of the metal layer of the hydrogen-releasing film and from corroding.

The material of the coat layer is preferably one capable of forming a surface having a water contact angle of 85° or more, and examples thereof include a fluorine-based compound, a rubber-based polymer, a silicone-based polymer, a urethane-based polymer, and a polyester-based polymer. Among these, from the viewpoint that the water contact angle is large and the hydrogen permeability of the hydrogen-releasing film is less likely to be inhibited, it is preferable to use at least one kind selected from the group consisting of a fluorine-based compound, a rubber-based polymer, and a silicone-based polymer.

Examples of the fluorine-based compounds include fluoroalkyl group-containing compounds (e.g. fluoroalkyl carboxylates, fluoroalkyl quaternary ammonium salts, fluoroalkyl ethylene oxide adducts, etc.); perfluoroalkyl group-containing compounds (e.g. perfluoroalkyl carboxylates, perfluoroalkyl quaternary ammonium salts, perfluoroalkyl ethylene oxide adducts, etc.); fluorocarbon group-containing compounds (e.g. tetrafluoroethylene/hexafluoropropylene copolymers, tetrafluoroethylene/perfluoroalkyl vinyl ether copolymers, etc.); tetrafluoroethylene polymers; copolymers of vinylidene fluoride and tetrafluoroethylene; copolymers of vinylidene fluoride and hexafluoropropylene; fluorine-containing (meth)acrylic esters; fluorine-containing (meth)acrylate ester polymers; fluorine-containing (meth)acrylic alkyl ester polymers; copolymers of fluorine-containing (meth)acrylic esters and other monomers, and the like.

In addition, as the fluorine-based compound which is a raw material of the coat layer, "DuraSurf" series manufactured by Harves Co., Ltd., "Optool" series manufactured by Daikin Industries, Ltd., and "KY-100" series manufactured by Shin-Etsu Chemical Co., Ltd. may be used.

Examples of the rubber-based polymers include natural rubber, styrene butadiene rubber, acrylonitrile butadiene rubber, chloroprene rubber, polyisoprene rubber, polybutadiene rubber, ethylene propylene rubber, ethylene-propylene-diene terpolymer rubber, chlorosulfonated polyethylene rubber, and ethylene-vinyl acetate copolymer rubber.

Further, as the rubber-based polymer which is a raw material of the coat layer, "ELEP COAT" series manufactured by Nitto Shinko Corporation may be used.

Examples of the silicone-based polymers include polydimethylsiloxane, alkyl-modified polydimethylsiloxane, carboxyl-modified polydimethylsiloxane, amino-modified polydimethylsiloxane, epoxy-modified polydimethylsiloxane, fluorine-modified polydimethylsiloxane, (meth)acrylate-modified polydimethylsiloxane, and the like.

The coat layer can be formed, for example, by coating a coat layer raw material composition on a metal layer or another layer provided on the metal layer and curing the composition.

The coating method is not particularly limited, and examples thereof include a roll coating method, a spin coating method, a dip coating method, a spray coating method, a bar coating method, a knife coating method, a die coating method, an ink jet method, a gravure coating method, and the like.

The solvent may be appropriately selected depending on the material of the coat layer. When a fluorine-based compound is used as a raw material for the coat layer, solvents, such as fluorine-based solvents, alcohol-based solvents, ether-based solvents, ester-based solvents and hydrocarbon-based solvents, can be used singly or in combination thereof. Among them, it is preferable to use a fluorine-based solvent which does not have inflammability and quickly volatilizes, singly or as a mixture with other solvents.

Examples of the fluorine-based solvents include hydrofluoroether, perfluoropolyether, perfluoroalkane, hydrofluoropolyether, hydrofluorocarbon, perfluorocycloether, perfluorocycloalkane, hydrofluorocycloalkane, xylene hexafluoride, hydrofluorochlorocarbon, perfluorocarbon, and the like.

The thickness of the coat layer is not particularly limited, but it is preferably 0.1 to 20 μm, more preferably 0.2 to 10 μm, even more preferably 0.3 to 5 μm.

A support may be provided on one side or both sides of the metal layer. In particular, since the metal layer obtained by the sputtering method has a thin film thickness, it is preferable to laminate a support on one side or both sides of the metal layer in order to improve the mechanical strength.

Figure 1B:
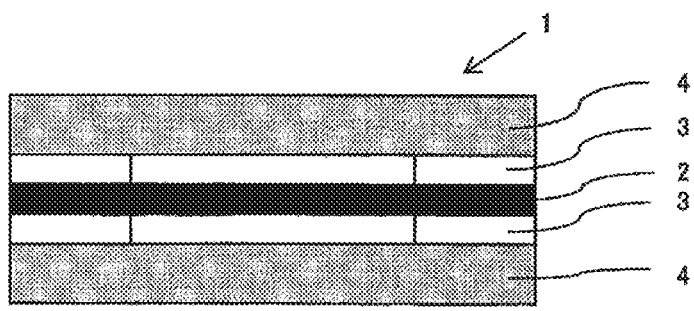
Figure 2A:
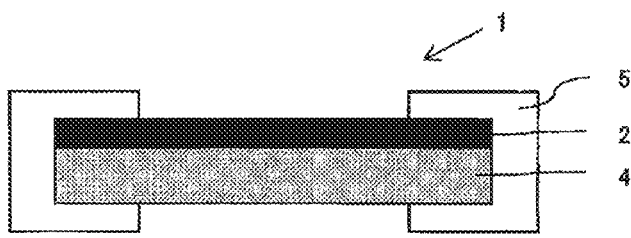
FIGS. 2(a) and 2(b) are schematic sectional views showing the another structure of the hydrogen-releasing film of the present invention.
Figure 2B:
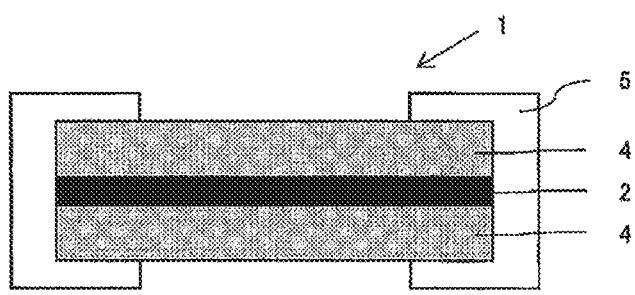

FIGS. 1 and 2 are schematic sectional views showing the structure of a hydrogen-releasing film 1. As shown in FIG. 1(a) or 1(b), a support 4 may be laminated on one side or both sides of a metal layer 2 using a ring-shaped adhesive 3, or the support 4 may be laminated on one side or both sides of the metal layer 2 using a jig 5 as shown in FIG. 2(a) or 2(b).

The support 4 is hydrogen permeable and is not particularly limited as long as it can support the metal layer 2. The support may be a non-porous body or may be a porous body. Also, the support 4 may be a woven fabric or may be a non-woven fabric. As a material for forming the support 4, it includes, for example, polyolefin such as polyethylene and polypropylene, polyester such as polyethylene terephthalate and polyethylene naphthalate, polyarylethersulfone such as polysulfone and polyethersulfone, fluororesin such as polytetrafluoroethylene and polyvinylidene fluoride, epoxy resin, polyamide, polyimide, polyamideimide, and the like. Of these, polysulfone, polytetrafluoroethylene, polyamide, polyimide, polyamideimide, which are chemically and thermally stable, are preferably used.

The support 4 is preferably a porous body having an average pore diameter of 100 μm or less. When the average pore diameter exceeds 100 μm, the surface smoothness of the porous body is lowered, so that it is difficult to form a metal layer having a uniform film thickness on the porous body when manufacturing the metal layer by a sputtering method or the like, and pinholes or cracks are likely to occur in the metal layer.

The thickness of the support 4 is not particularly limited, but is usually about 5 to 1000 μm, preferably 10 to 300 μm.

When producing the metal layer 2 by the sputtering method, such layer can be directly formed on the support 4 which is used as a substrate and the hydrogen-releasing film 1 can be produced without using the adhesive 3 or jig 5. Thus, this method is preferable from the viewpoint of physical properties and production efficiency of the hydrogen-releasing film 1. In that case, it is preferable to use, as the support 4, a porous body having an average pore diameter of 100 μm or less, more preferable to use a porous body having an average pore diameter of 5 μm or less, and particularly preferable to use an ultrafiltration membrane (UF membrane).

The shape of the hydrogen-releasing film may be substantially circular or polygonal such as triangle, square, and pentagon. Any shape can be taken depending on the application to be described later.

The hydrogen-releasing film is particularly useful as a component of a safety valve for an electrochemical element. Furthermore, the hydrogen-releasing film may be provided on an electrochemical element as a hydrogen-releasing valve aside from the safety valve.

Since the hydrogen-releasing film is not embrittled at a low temperature, there is an advantage that the film can be used at a temperature of, for example, 150° C. or lower, furthermore 110° C. or lower. That is, such hydrogen-releasing film is suitably used as a safety valve or a hydrogen-releasing valve in an aluminum electrolytic capacitor or a lithium ion battery which is not used at a high temperature (for example, 400 to 500° C.).

As the separator, one containing pulp and having a total sulfur component content of 400 ppm or less as measured by quartz tube combustion ion chromatography is used. Here, the quartz tube combustion ion chromatography refers to an ion chromatography in which a sample is completely burned in a quartz tube, and the gas generated at that time is absorbed by water for use as a test liquid.

The sulfur components measured by quartz tube combustion ion chromatography take various forms in the separator.

That is, the sulfur components exist in the form of hydrogen sulfide, methyl mercaptan, methyl sulfide, methyl disulfide and the like, or as an organic sulfur compound directly bonded to cellulose or the like. These sulfur components remaining in the separator are agents used when pulp is produced by removing resin (lignin) from raw materials such as chips and raw hemp and are those resulting from reaction of these agents with raw materials. A plurality of methods (digestion methods) for making pulp from chips and raw hemp are known, and a craft process, a sulfite method, a soda method, and the like are often used. In the above methods, a digestion step, a delignification step with hydrogen peroxide, an enzyme and the like, and a refining and washing step to remove foreign matters and residual components in the pulp are performed, but by performing these steps more strictly, the content of the sulfur components in the separator can be reduced.

The separator has a total sulfur component content of 400 ppm or less, preferably 250 ppm or less, more preferably 200 ppm or less, even more preferably 100 ppm or less, as measured by quartz tube combustion ion chromatography. When a separator having a total sulfur component content of more than 400 ppm is used, the metal layer of the hydrogen-releasing film is easily corroded by the sulfur components, and the metal layer is easily deteriorated. As a result, the hydrogen-releasing performance of the hydrogen-releasing film tends to be lowered. The content of the total sulfur component can be measured by the method described in Examples described later.

The separator may be made of wood pulp alone or may be used in combination with other fiber types. As other fiber types, for example, non-wood pulp, regenerated cellulose fiber and the like are suitably used.

These pulps and fibers may be subjected to bleaching treatment or may be refined like dissolving pulp or may be mercerized pulp.

As the wood pulp, coniferous trees (e.g. spruce, fir, pine, and *Tsuga sieboldii*, etc.) and broad-leaved trees (e.g. beech, oak, birch, *eucalyptus*, etc.) can be used. Examples of non-wood pulp include vein fibers (e.g. Manila hemp, sisal hemp, banana, pineapple, etc.), bast fibers (e.g. kozo (paper mulberry), mitsumata (Edgeworthia *papyrifera*), ganpi (Diplomorpha sikokiana), jute, Kenaf, hemp, flax, etc.), Gramineae plant fibers (e.g. esparto grass, bamboo, bagasse, rice straw, wheat straw, reed, etc.), seed hair fibers (e.g. cotton, linter, kapok, etc.), fruit fibers (e.g. coconut, etc.), or various plants (e.g. rush, sabai grass, etc.) can be used. As the regenerated cellulose fiber, a solvent-spun regenerated cellulose fiber can be suitably used. These may be used singly, or plural kinds thereof may be selected and used.

As a method for producing pulp satisfying the above-mentioned content of all sulfur components, for example, the following methods can be mentioned, including the pre/post treatment.

Examples of the pulp include unbleached soda pulp, unbleached dissolving kraft pulp, unbleached dissolving sulfite pulp, unbleached dissolving soda pulp, TCF bleached kraft pulp, TCF bleached sulfite pulp, TCF bleached soda pulp, TCF bleached dissolving kraft pulp, TCF bleached dissolving sulfite pulp, and TCF bleached dissolving soda pulp. These pulps may be subjected to mercerization processing.

The pulp name of this embodiment is expressed in the order of fiber type; bleaching/non-bleaching treatment or bleaching method; dissolving pulp or mercerized pulp; and manufacturing method. Where there is no statement of "dissolving" and "mercerized" as to the pulp, such a pulp is neither a dissolving pulp nor a mercerized pulp.

The fibers used for the separator may be beaten. For this beating process, a beating machine, such as a disc refiner, a conical refiner, a high-pressure homogenizer, a beater and the like, which is generally used for preparing papermaking raw materials, can be used without particular limitation. The CSF (Canadian Standard Freeness) value indicating the degree of beating can be set to any value between 0 and 800 ml. The CSF value here is a value according to "JIS P 8121-2 Pulp-Freeness Test Method-Part 2: Canadian Standard Freeness Method".

The separator is formed by a papermaking method. The papermaking form can be selected from Fourdrinier paper, short mesh paper or cylinder paper. Further, the papermaking form may be a multilayered paper composed of a plurality of these. For paper making, commonly used additives such as a dispersant, an antifoaming agent, and a paper strength enhancer may be added. Further, post-processing such as paper strength enhancement processing, calendaring processing, emboss processing and the like may be performed after forming the paper layer.

It is preferable that the separator has a density of 0.25 to 1.00 g/cm$^3$ and a thickness of 20 to 100 μm. When the density of the separator is less than 0.25 g/cm$^3$, the tensile strength is insufficient, and the necessary strength cannot be secured at the time of manufacturing the capacitor. In addition, the shielding property of the separator decreases, and the short-circuit failure of the capacitor increases. On the other hand, if the density exceeds 1.00 g/cm$^3$, the ion permeability deteriorates, and the characteristics of the capacitor deteriorate. In addition, when the thickness of the separator is less than 20 μm, it is difficult to ensure denseness, and the short-circuit failure of the capacitor increases. On the other hand, if the thickness exceeds 100 μm, the ion permeability deteriorates, and the capacitor characteristics deteriorate.

Figure 3:
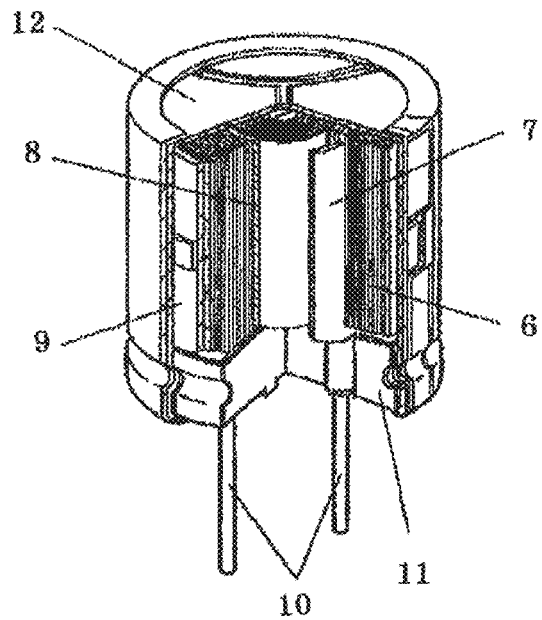
FIG. 3 is a perspective view showing an example of a structure of an aluminum electrolytic capacitor of the present invention.
Figure 4:
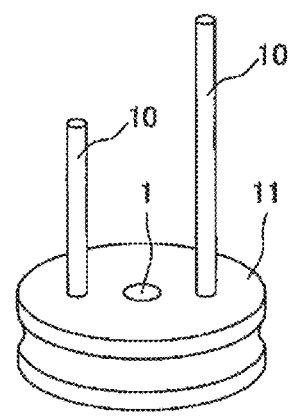
FIG. 4 is a perspective view showing an example of a structure of a sealing body provided with a hydrogen-releasing film.

FIG. 3 is a perspective view showing an example of the structure of the aluminum electrolytic capacitor of the present invention. A capacitor element 6 is constituted by winding an electrolytic paper (a separator) 9 between an anode foil 7 made of an aluminum foil and a cathode foil 8, and each electrode 7, 8 is joined with a lead wire 10 composed of a rod-like joint portion and an external lead portion that can be soldered. The capacitor element 6 is impregnated with a driving electrolytic solution (not shown) and housed in a case 12 made of a cylindrical aluminum having a bottom, and the opening of the case 12 is sealed with a sealing body 11. As shown in FIG. 4, a hydrogen-releasing film 1 is usually provided on the sealing body 11. The outer periphery of the case 12 is covered with an exterior member (not shown).

EXAMPLES

Description will be given of the invention with examples, while the invention is not limited to description in the examples.

Production Example 1

[Preparation of Pd—Au Alloy Layer by Rolling Method (Content of Au: 30 mol %)]

The raw materials Pd and Au were each weighed so that the content of Au in an ingot became 30 mol %, charged into an arc melting furnace equipped with a water-cooled copper crucible and subjected to arc melting in an Ar gas atmosphere under atmospheric pressure. The obtained button ingot was cold-rolled to a thickness of 5 mm using a two-stage rolling mill having a diameter of 100 mm to obtain a rolled sheet material. Then the rolled sheet material was placed in a glass tube and the both ends of the glass tube were sealed. After reducing the inside pressure of the glass tube to $5\times10^{-4}$ Pa at room temperature, the temperature was then raised to 700° C. and the glass tube was allowed to stand for 24 hours, followed by cooling to room temperature. By this heat treatment, the segregation of Pd and Au in the alloy was removed. Then, the sheet material was cold-rolled to 100 μm using a two-stage rolling mill having a roll diameter of 100 mm and further cold-rolled to 20 μm using a two-stage rolling mill having a roll diameter of 20 mm. Then the rolled sheet material was placed in a glass tube and the both ends of the glass tube were sealed. The inside pressure of the glass tube was reduced to $5\times10^{-4}$ Pa at room temperature, the temperature was then raised to 500° C., and the glass tube was allowed to stand for 1 hour, followed by cooling to room temperature. By this heat treatment, the internal strain in the Pd—Au alloy caused by rolling was removed, to prepare a hydrogen-releasing film consisting of a Pd—Au alloy layer having a thickness of 20 μm and an Au content of 30 mol %.

Example 1

An aluminum electrolytic capacitor was produced using the hydrogen-releasing film produced in Production Example 1 and a kraft paper having a total sulfur component content of 34 ppm as a separator.

Example 2

An aluminum electrolytic capacitor was produced using the hydrogen-releasing film produced in Production Example 1 and a kraft paper having a total sulfur component content of 69 ppm as a separator.

Example 3

An aluminum electrolytic capacitor was produced using the hydrogen-releasing film produced in Production Example 1 and a kraft paper having a total sulfur component content of 57 ppm as a separator.

Example 4

An aluminum electrolytic capacitor was produced using the hydrogen-releasing film produced in Production Example 1 and a kraft paper having a total sulfur component content of 110 ppm as a separator.

Example 5

An aluminum electrolytic capacitor was produced using the hydrogen-releasing film produced in Production Example 1 and a kraft paper having a total sulfur component content of 250 ppm as a separator.

Example 6

An aluminum electrolytic capacitor was produced using the hydrogen-releasing film produced in Production Example 1 and a kraft paper having a total sulfur component content of 380 ppm as a separator.

Comparative Example 1

An aluminum electrolytic capacitor was produced using the hydrogen-releasing film produced in Production Example 1 and a kraft paper having a total sulfur component content of 480 ppm as a separator.

Comparative Example 2

An aluminum electrolytic capacitor was produced using the hydrogen-releasing film produced in Production Example 1 and a kraft paper having a total sulfur component content of 570 ppm as a separator.

[Measurement and Evaluation Method]

(Measurement of Content of Total Sulfur Component Content by Quartz Tube Combustion Ion Chromatography)

The total sulfur component content was measured according to [JIS K 0127 "Ion Chromatography General Rule"]. The sample was pretreated by the quartz tube combustion method described in "JIS K 0127 6.3.5 Pretreatment before Combustion of Organic Compound", and the generated gas was absorbed by the absorbing liquid and used for the measurement. The following device was used as the analyzer.

(1) Automatic Sample Combustion Apparatus

Apparatus: "AQF-2100H" manufactured by Mitsubishi Chemical Analytech Co., Ltd.

Temperature: Inlet 1000° C., Outlet 1100° C.

Gas flow rate: $O_2$ 400 mL/min, Ar/$O_2$ 200 mL/min, Ar (water supply unit: scale 2) 100 mL/min (2) Ion Chromatograph (Anion)

Apparatus: "DX-320" manufactured by Thermo Fisher Scientific

Separation column: Dionex IonPac AS15 (4 mm×250 mm)

Guard column: Dionex IonPac AG15 (4 mm×50 mm)

Removal system: Dionex AERS-500 (recycle mode)

Detector: Electrical conductivity detector

Eluent: Aqueous KOH solution

Eluent flow rate: 1.2 mL/min

Sample injection volume: 250 µL (Evaluation of Hydrogen Permeability)

The hydrogen-releasing film produced in Production Example 1 was attached to a VCR connector manufactured by Swagelok Company, and a SUS tube was attached to one side of the connector. In this way, a sealed space (63.5 ml) was produced. After the pressure inside the tube was reduced by a vacuum pump, the pressure of the hydrogen gas was adjusted to 0.15 MPa, and a pressure change in an environment of 105° C. was monitored. Since the number of moles of hydrogen (volume) transmitted through the hydrogen-releasing film can be known by the pressure change, this volume was converted to a permeation amount per day and taken as a hydrogen permeation amount. For example, when the pressure changes from 0.15 MPa to 0.05 MPa (variation 0.10 MPa) in 2 hours, the volume of hydrogen that has passed through the hydrogen-releasing film is 63.5 ml. Therefore, the hydrogen permeation amount per day is 63.5×24/2=762 ml/day. The hydrogen permeation amount of the hydrogen-releasing film is preferably 10 ml/day or more, more preferably 100 ml/day or more.

(Evaluation of Corrosion Resistance)

Samples impregnated with ethylene glycol in 50 g of the separator used in Examples and Comparative Examples were respectively placed in a sealed SUS can, and the hydrogen-releasing film (15 mm×15 mm) produced in Production Example 1 was suspended from the lid of the SUS can. Heat treatment was performed at 105° C. for 12 hours, and the gas generated from each sample was exposed to the surface of the hydrogen-releasing film. Thereafter, hydrogen permeability was evaluated in the same manner as described above.

(Evaluation of Aluminum Electrolytic Capacitor)

A voltage of 400 V was applied to the aluminum electrolytic capacitors prepared in Examples and Comparative Examples at an ambient temperature of 105° C. for 500 hours. After that, deformation of the aluminum case of the aluminum electrolytic capacitor was visually confirmed.

◯: No change in shape of aluminum case x: Occurrence of expansion of aluminum case

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| Separator | | Kraft paper | Kraft paper | Kraft paper | Kraft paper | Kraft paper | Kraft paper | Kraft paper | Kraft paper |
| Total sulfur component content (ppm) | | 34 | 69 | 57 | 110 | 250 | 380 | 480 | 570 |
| Hydrogen permeation amount (ml/day) | Before exposure | 1190 | 1190 | 1190 | 1190 | 1190 | 1190 | 1190 | 1190 |
| | After exposure | 877 | 1013 | 691 | 180 | 45 | 12 | 0 | 0 |
| Evaluation of aluminum electrolytic capacitor | | ◯ | ◯ | ◯ | ◯ | ◯ | ◯ | x | x |

As can be seen from Table 1, in Comparative Examples 1 and 2 in which a separator having a total sulfur component content exceeding 400 ppm was used, the hydrogen permeability of the hydrogen-releasing film was lost due to corrosion, so that expansion of the aluminum case was observed because hydrogen gas could not be discharged to the outside. On the other hand, in Examples 1 to 6, since a separator having a total sulfur component content of 400 ppm or less is used, the hydrogen permeability of the hydrogen-releasing film is good even in the co-presence of the separator, and the internal pressure rise of the aluminum electrolytic capacitor can be prevented, so that deformation of the aluminum case did not occur.

INDUSTRIAL APPLICABILITY

The electrochemical element of the present invention is suitably used for various electric power sources and the like.

DESCRIPTION OF REFERENCE SIGNS

1: Hydrogen-releasing film
2: Metal layer
3: Adhesive
4: Support
5: Jig
6: Capacitor element
7: Anode foil
8: Cathode foil
9: Electrolytic paper (separator)
10: Lead wire
11: Sealing body
12: Case

The invention claimed is:

1. An electrochemical element equipped with a hydrogen-releasing film and having a laminated body in which an anode and a cathode are laminated with a separator interposed therebetween, wherein the hydrogen-releasing film contains a metal layer, the separator contains pulp, and the total sulfur component content in the separator is 400 ppm or less as determined by quartz tube combustion gas absorption ion chromatography.

2. The electrochemical element according to claim 1, wherein the metal layer is an alloy layer containing a Pd alloy.

3. The electrochemical element according to claim 2, wherein the Pd alloy contains 20 to 65 mol % of a group 11 element.

4. The electrochemical element according to claim 3, wherein the group 11 element is at least one kind selected from the group consisting of Au, Ag, and Cu.

5. The electrochemical element according to claim 1, wherein the hydrogen-releasing film has a support on one side or both sides of the metal layer.

6. The electrochemical element according to claim 1, which is an aluminum electrolytic capacitor or a lithium-ion battery.

* * * * *